(12) United States Patent
Jaegal

(10) Patent No.: US 12,452,859 B2
(45) Date of Patent: Oct. 21, 2025

(54) METHOD AND APPARATUS FOR ALLOCATING RESOURCES TO VEHICLE IN V2X

(71) Applicant: LG Electronics Inc., Seoul (KR)

(72) Inventor: Chan Jaegal, Seoul (KR)

(73) Assignee: LG Electronics Inc., Seoul (KR)

( * ) Notice: Subject to any disclaimer, the term of this patent is extended or adjusted under 35 U.S.C. 154(b) by 375 days.

(21) Appl. No.: 18/015,214

(22) PCT Filed: Jul. 21, 2021

(86) PCT No.: PCT/KR2021/009410
§ 371 (c)(1),
(2) Date: Jan. 9, 2023

(87) PCT Pub. No.: WO2022/019645
PCT Pub. Date: Jan. 27, 2022

(65) Prior Publication Data
US 2023/0269728 A1    Aug. 24, 2023

(30) Foreign Application Priority Data
Jul. 22, 2020   (KR) .................. 10-2020-0091241

(51) Int. Cl.
*H04W 72/1263* (2023.01)
*H04W 72/25* (2023.01)
*H04W 72/52* (2023.01)

(52) U.S. Cl.
CPC ....... *H04W 72/1263* (2013.01); *H04W 72/25* (2023.01); *H04W 72/52* (2023.01)

(58) Field of Classification Search
CPC . H04W 72/1263; H04W 72/25; H04W 72/52; H04W 72/20; H04W 72/21;
(Continued)

(56) References Cited

U.S. PATENT DOCUMENTS 10,252,721 B1 *   4/2019   Bai ................... B60Q 1/508
2018/0041956 A1    2/2018   Abraham et al.
(Continued)

FOREIGN PATENT DOCUMENTS

EP          3675560         7/2020
KR       20170123236       11/2017
(Continued)

OTHER PUBLICATIONS

International Search Report in International Appln. No. PCT/KR2021/009410, mailed on Nov. 4, 2021, 4 pages.

*Primary Examiner* — Mohamed A Kamara
(74) *Attorney, Agent, or Firm* — Fish & Richardson P.C.

(57) ABSTRACT

Provided are a method by which a first device performs wireless communication, and an apparatus for supporting same. The method may comprise the steps of: generating at least one token on the basis of a bucket size and a token generation rate; determining, on the basis of the triggering of the first manipulation intent, the number of tokens for executing a first manipulation intent; transmitting, to a second device, sidelink control information (SCI) for scheduling a physical sidelink shared channel (PSSCH) through a physical sidelink control channel (PSCCH), the SCI including information related to priorities, information related to resource allocation, and information related to a modulation and coding scheme (MCS); and transmitting, to the second device through the PSSCH, a medium access control protocol data unit (MAC PDU) including the information related to the number of tokens and a request for the first manipulation intent.

20 Claims, 23 Drawing Sheets

(58) Field of Classification Search
CPC ...... H04W 72/40; H04W 4/46; G08G 1/0968; H04L 47/215
See application file for complete search history.

(56) References Cited

U.S. PATENT DOCUMENTS

| | | | |
|---|---|---|---|
| 2021/0058328 A1* | 2/2021 | Xu | H04W 72/0446 |
| 2021/0127364 A1* | 4/2021 | Panteleev | H04L 1/1819 |
| 2021/0306824 A1* | 9/2021 | Li | H04W 4/40 |

FOREIGN PATENT DOCUMENTS

| | | | |
|---|---|---|---|
| KR | 20180080199 | 7/2018 | |
| KR | 20190051894 | 5/2019 | |
| WO | WO-2020151324 A1 * | 7/2020 | ........... H04L 47/215 |

* cited by examiner

METHOD AND APPARATUS FOR ALLOCATING RESOURCES TO VEHICLE IN V2X

CROSS-REFERENCE TO RELATED APPLICATIONS

This application is a National Stage application under 35 U.S.C. § 371 of International Application No. PCT/KR2021/009410, filed on Jul. 21, 2021, which claims the benefit of Korean Patent Application No. 10-2020-0091241, filed on Jul. 22, 2020. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, Maneuver Sharing Coordination Service (MSCS) is a service for sharing a maneuver plan between vehicles through connected cars and determining and executing a final maneuver plan through agreement and coordination. According to the conventional MSCS, a problem in which a specific vehicle monopolizes resource allocation and a problem in which resource allocation is not possible for all vehicles may occur.

In one embodiment, provided is a method for performing wireless communication by a first device. The method may comprise: generating at least one token based on a size of a bucket and a token creation rate; determining, based on a triggering of a first manipulation intention, a number of tokens for executing the first manipulation intention; transmitting, to a second device, sidelink control information (SCI) for scheduling a physical sidelink shared channel (PSSCH) through a physical sidelink control channel (PSCCH), wherein the SCI includes information regarding a priority, information regarding resource assignment, and information regarding modulation and coding scheme (MCS); and transmitting, to the second device, a medium access control (MAC) protocol data unit (PDU) including information regarding the number of tokens and a request for the first manipulation intention through the PSSCH.

In one embodiment, provided is a method for performing wireless communication by a first device. The method may comprise: generating at least one token based on a size of a bucket and a token creation rate; determining, based on a triggering of a manipulation intention, a number of tokens for executing the manipulation intention; and transmitting, to a second device, a message including information regarding the number of tokens and a request for the manipulation intention.

In one embodiment, provided is a method for performing wireless communication by a second device. The method may comprise: determining, based on a triggering of a second manipulation intention, a number of tokens for executing the second manipulation intention; receiving, from a first device, a message including information regarding a number of tokens for executing a first manipulation intention and a request for the first manipulation intention; comparing the number of tokens for executing the first manipulation intention and the number of tokens for executing the second manipulation intention; and transmitting, to the first device, acceptance information or rejection information for the request based on the comparison, wherein a resource to be occupied by the first manipulation intention of the first device overlaps a resource to be occupied by the second manipulation intention of the second device.

Resources can be fairly allocated among vehicles.

DETAILED DESCRIPTION

Figure 1:
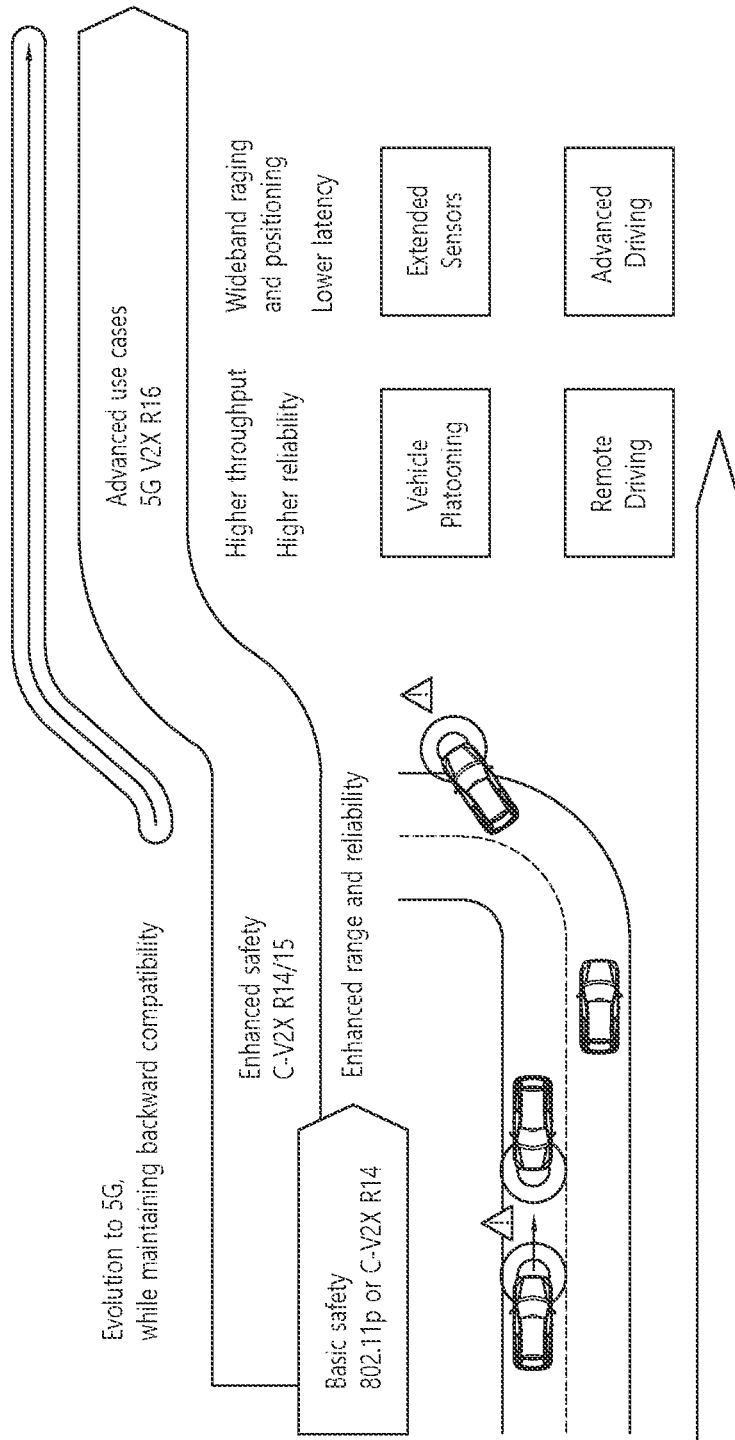
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G-NR. However, technical features according to an embodiment of the present disclosure will not be limited only to this.

Figure 2:
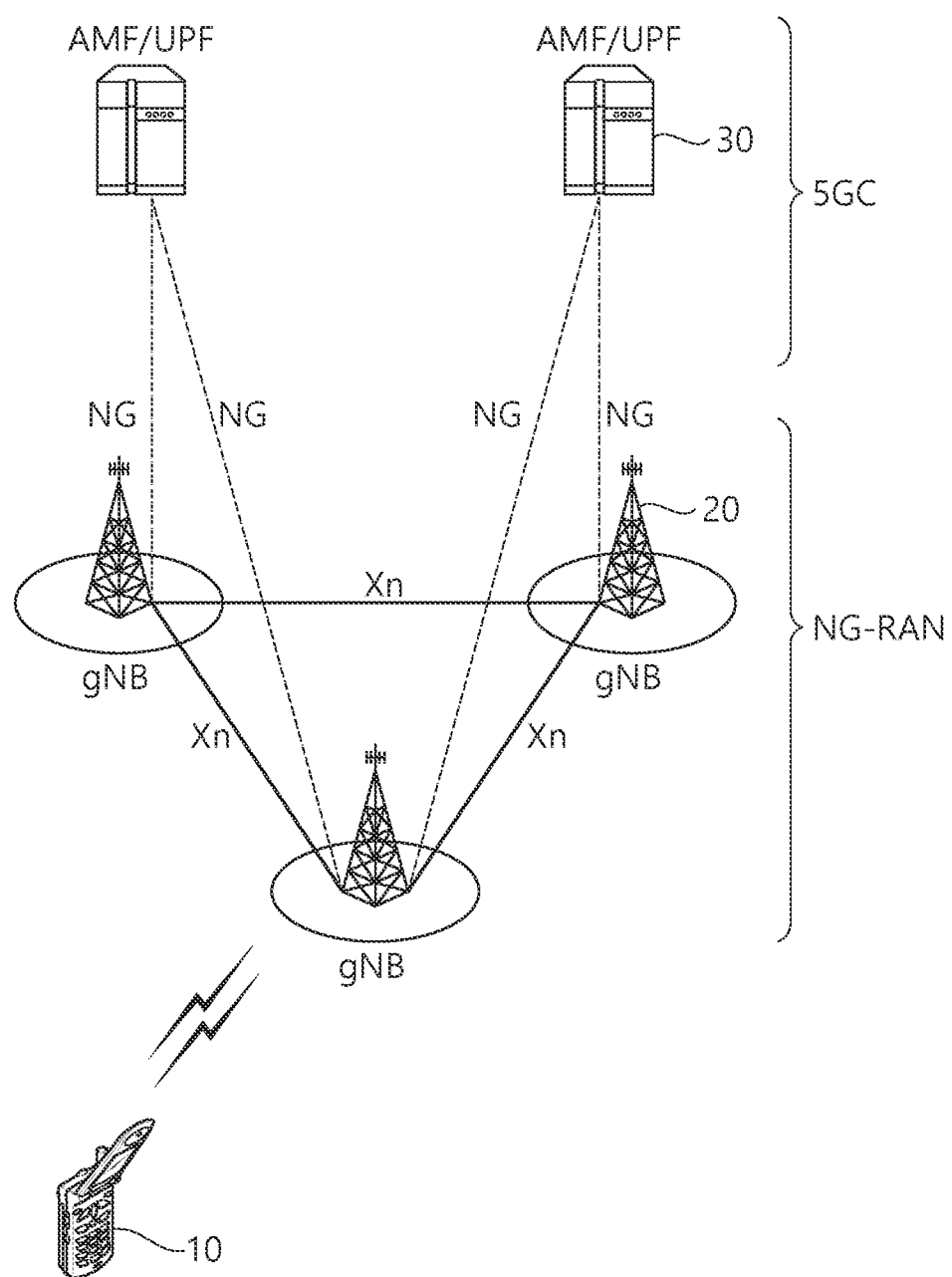
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
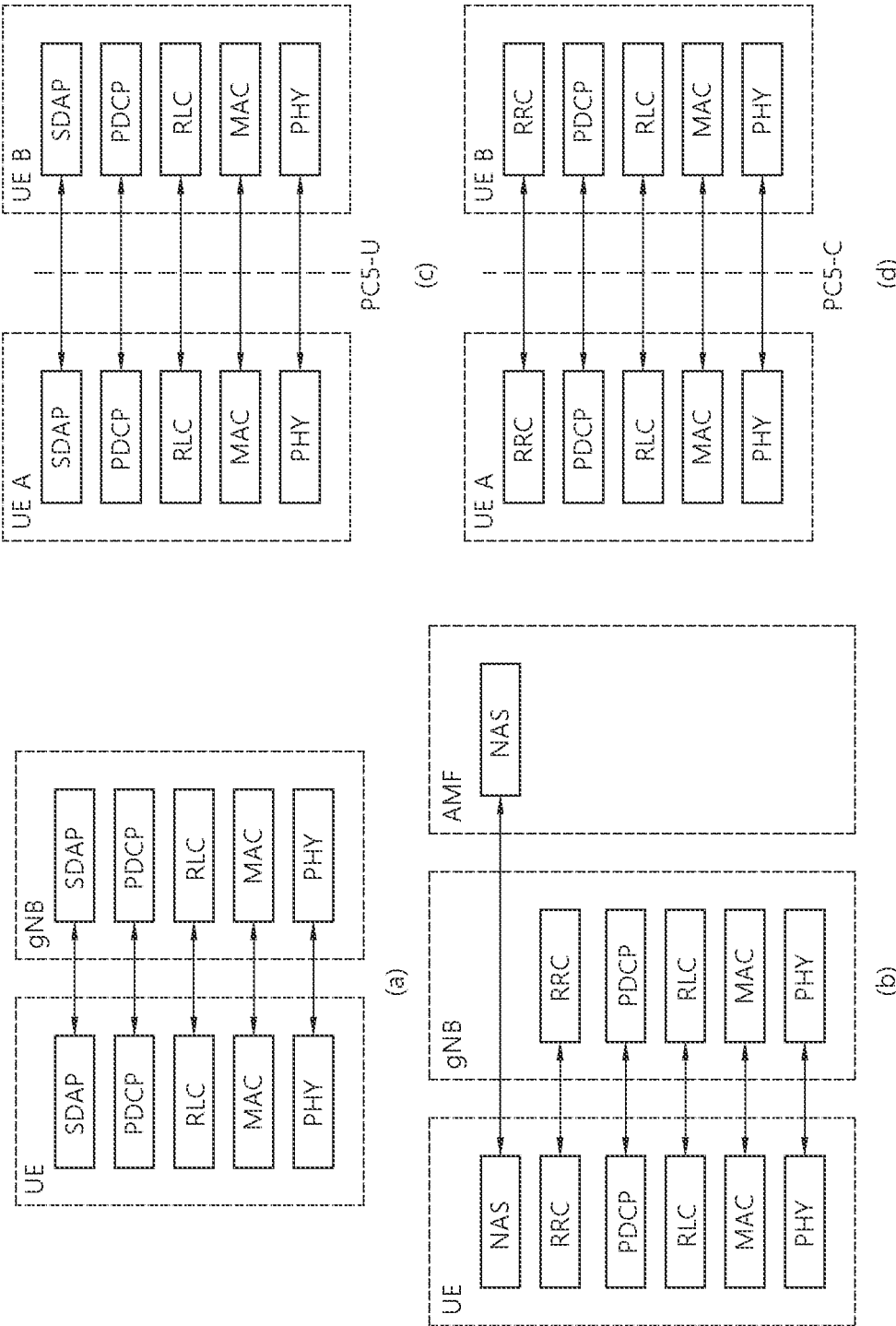
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication, (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
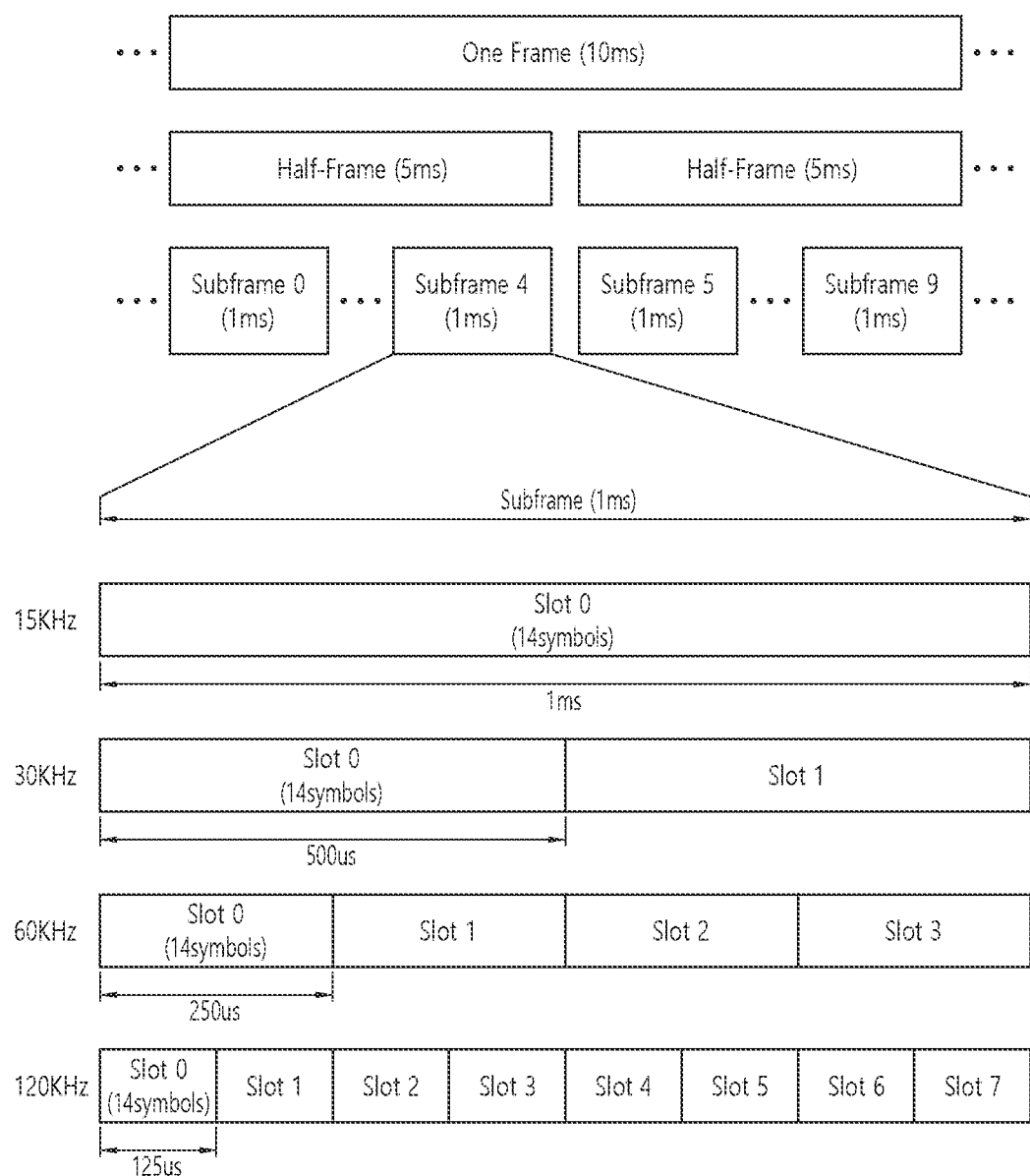
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-TDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 71.25 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
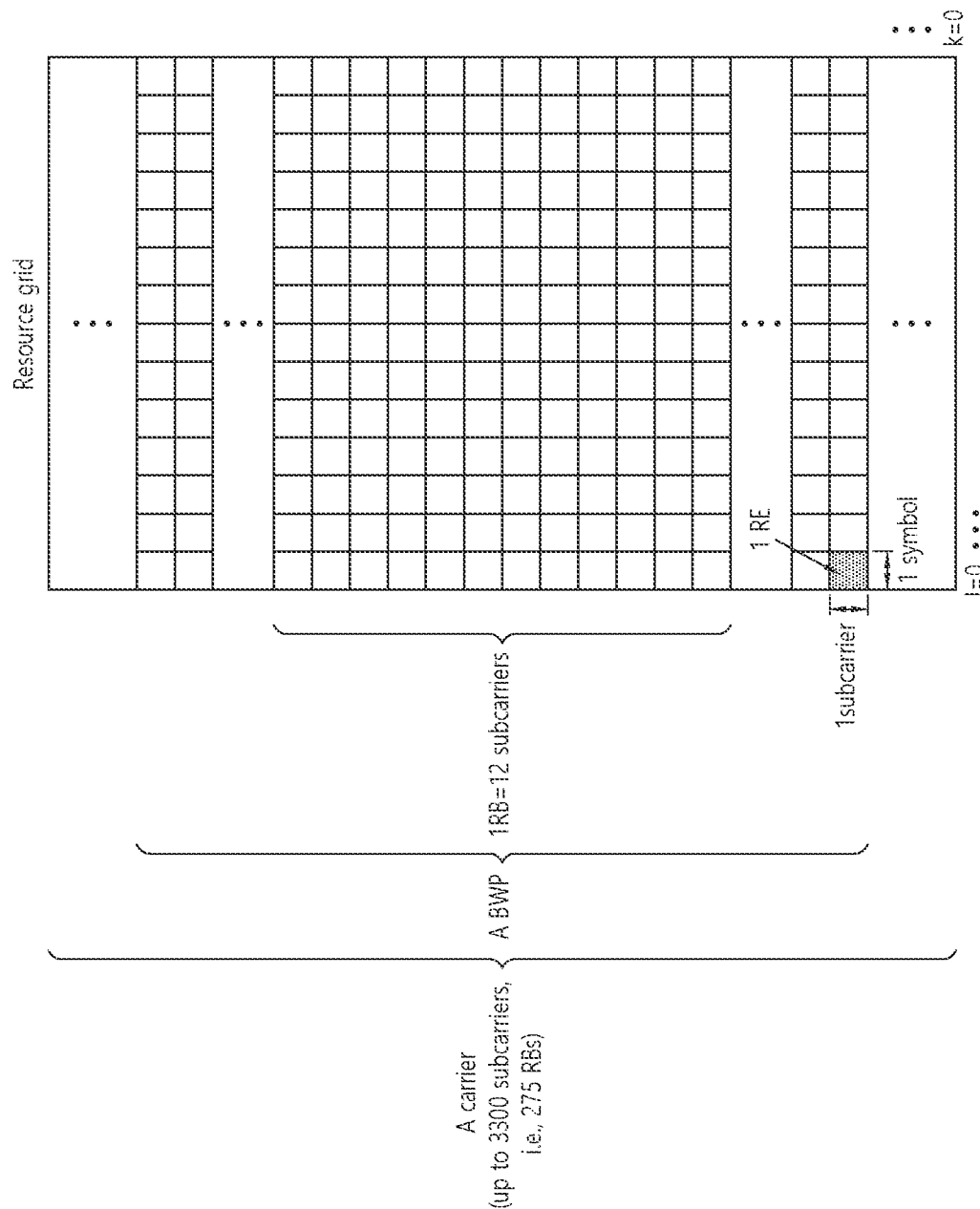
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDCCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PDCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE LTE. For the UE in the RRC_CONNECTED mode, at least one SL BWP may be activated in the carrier.

Figure 6:
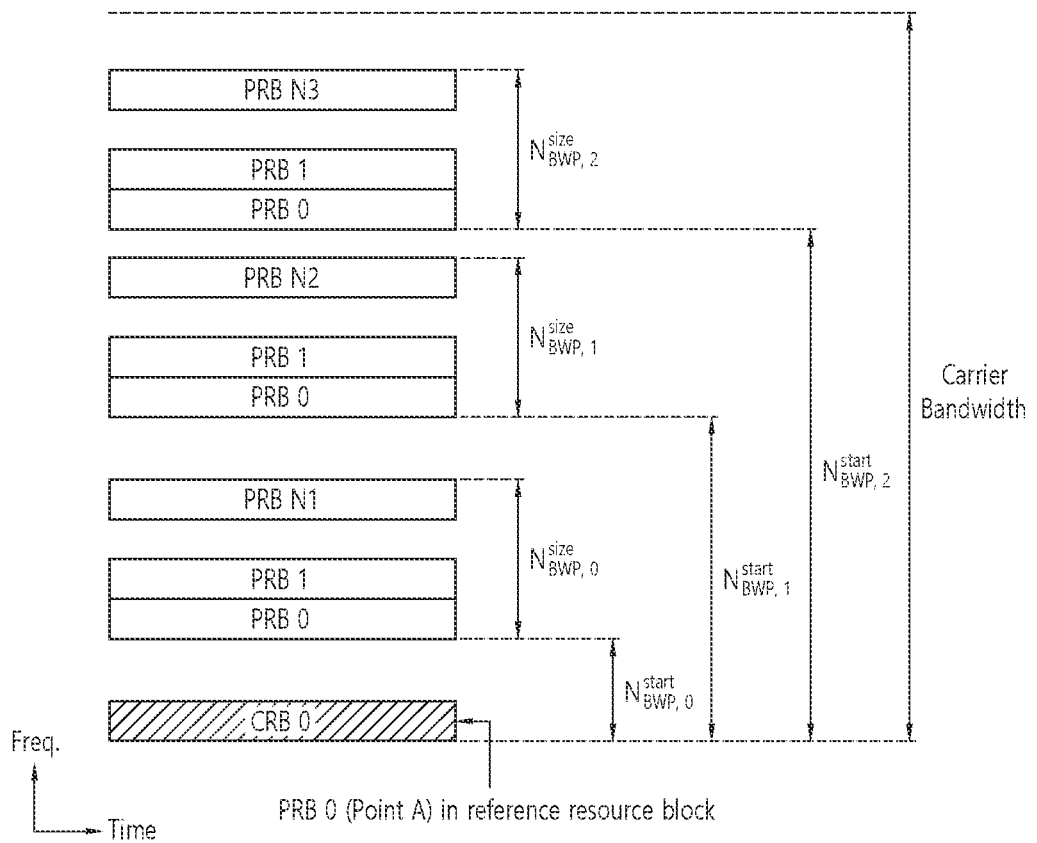
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
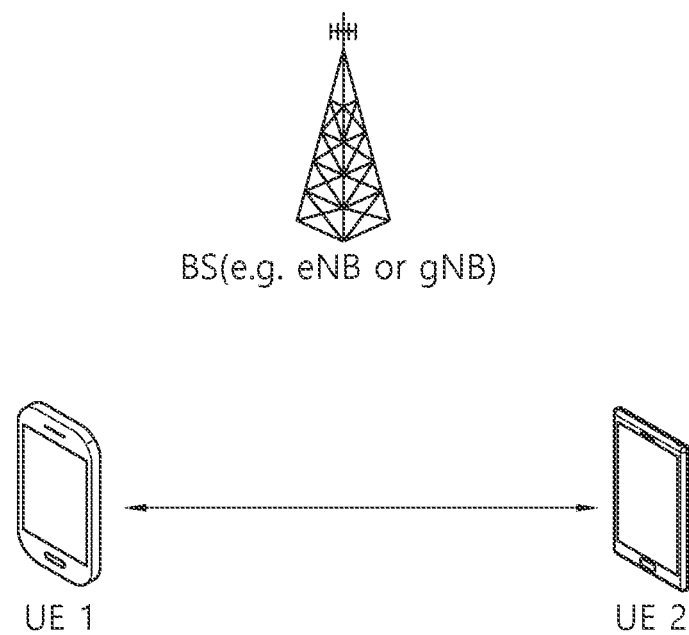
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
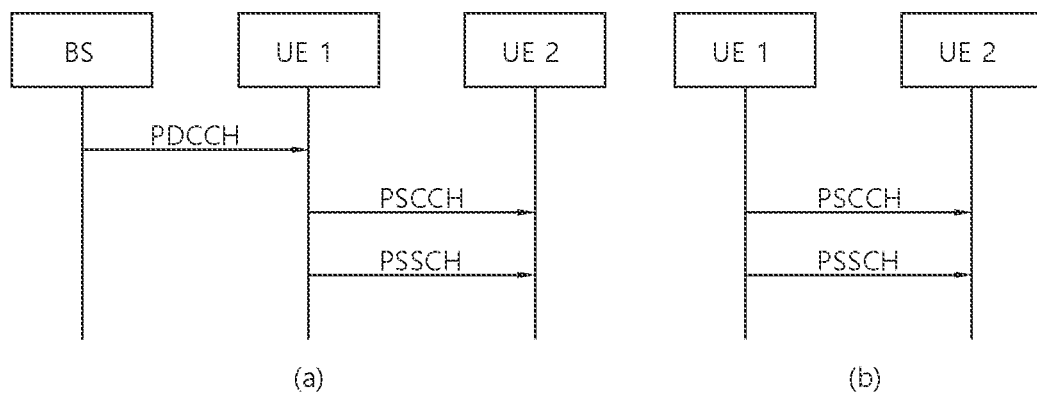
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1 the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
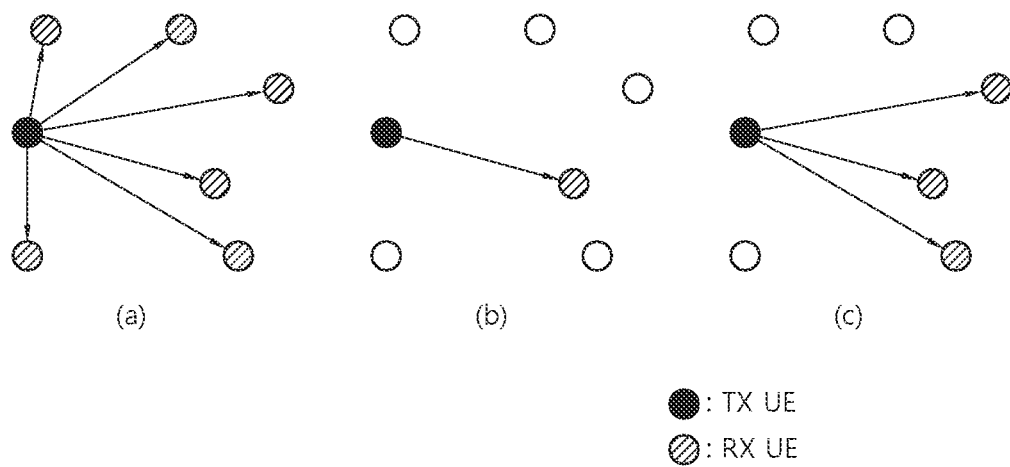
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR).

The UE may measure the CBR for a channel/frequency. Additionally, the UE may transmit the measured CBR to the network/BS.

Figure 10:
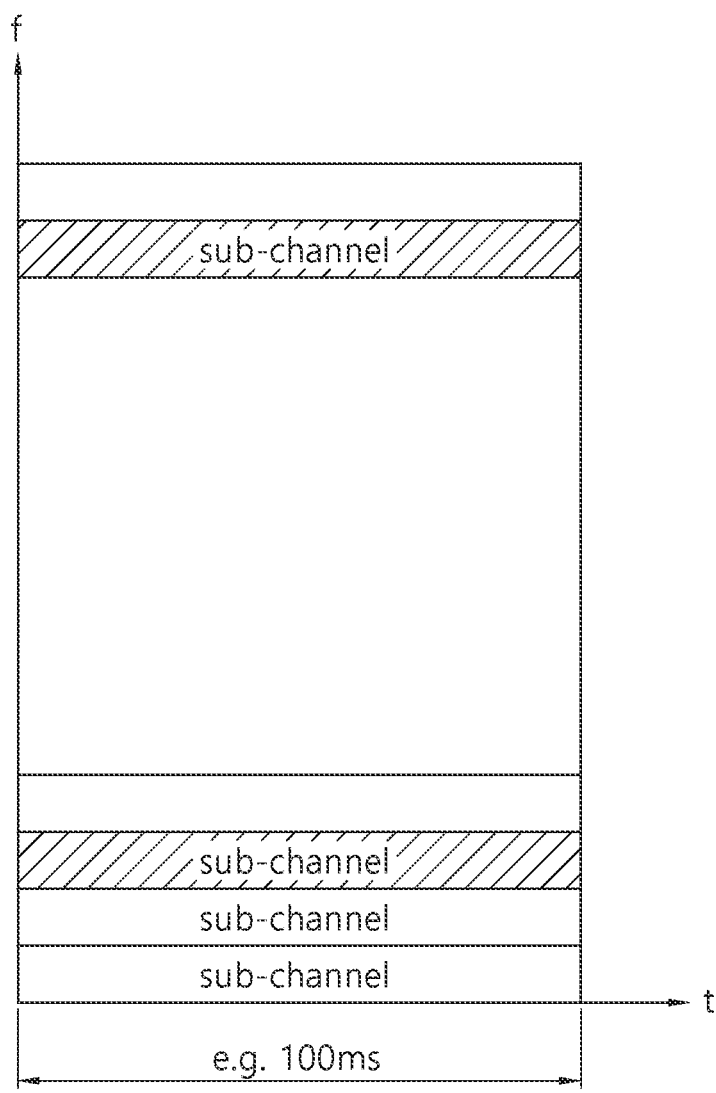
FIG. 10 shows a resource unit for CBR measurement, based on an embodiment of the present disclosure.

FIG. 10 shows a resource unit for CBR measurement, based on an embodiment of the present disclosure. The embodiment of FIG. 10 may be combined with various embodiments of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the UE may report the CBR to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, groupcast).

For example, the transmitting UE may transmit the entirety or part of information described below to the receiving UE, through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or
  SL CSI report request indicator or SL (L1) RSRP (and/or SL (L1) RSRQ and/or SL (L1) RSSI) report request indicator, and/or
  SL CSI transmission indicator (or SL (L1) RSRP (and/or SL (L1) RSRQ and/or SL (L1) RSSI) information transmission indicator)) (on PSSCH), and/or
  MCS information, and/or
  Transmit power information, and/or
  L1 destination ID information and/or L1 source ID information, and/or
  SL HARQ process ID information, and/or
  New data indicator (NDI) information, and/or
  Redundancy version (RV) information, and/or
  (Transmission traffic/packet related) QoS information, e.g., priority information, and/or
  SL CSI-RS transmission indicator or information on the number of (to-be-transmitted) SL CSI-RS antenna ports, and/or
  Location information of a transmitting UE or location (or distance region) information of a target receiving UE (for which SL HARQ feedback is requested), and/or
  Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since a transmitting UE may transmit at least one of a SCI, a first SCI, and/or a second SCI to a receiving UE through a PSCCH, the PSCCH may be replaced/substituted with at least one of the SCI, the first SCI and/or the second SCI. Additionally/alternatively, for example, the SCI may be replaced/substituted with at least one of the PSCCH, the first SCI, and/or the second SCI. Additionally/alternatively, for example, since a transmitting UE may transmit a second SCI to a receiving UE through a PSSCH, the PSSCH may be replaced/substituted with the second SCI.

In the present disclosure, the term "configuration/configured or definition/defined" may be interpreted as being (pre-)configured from the base station or the network (through predefined signaling (e.g., SIB, MAC signaling, RRC signaling)). For example, "A may be configured" may include "that the base station or the network (pre-)configures/defines or informs A to the UE". Alternatively, the term "configuration/configured or definition/defined" may be interpreted as being pre-configured or pre-defined in the system. For example, "A may be configured" may include "that A is pre-configured/defined in the system".

In the present disclosure, a packet or traffic may be replaced/substituted with a transport block (TB) or a medium access control (MAC) protocol data unit (PDU) according to a layer in which the packet or traffic is transmitted.

Meanwhile, Maneuver Sharing Coordination Service (MSCS) is a service for sharing a maneuver plan between vehicles through connected cars and determining and executing a final maneuver plan through agreement and coordination. Through the service, each vehicle can safely change lanes or avoid sudden collisions, and furthermore, each vehicle can be provided with efficient traffic flow through inter-vehicle coordination.

Vehicles using MSCS may require road resources to perform an intended maneuver. For example, a vehicle with the manipulation intention such as 'cut in' may require a road resource such as 'space to cut in'. However, when a plurality of vehicles intend to use a specific road resource at the same time, the road resource may not be smoothly allocated among the plurality of vehicles, a problem may occur as to which vehicle the resource should be allocated. Generally, this may be referred to as a resource allocation conflict.

If the resource allocation conflict occurs, the conflict may be resolved by considering priorities of execution of operations of vehicles given in advance, vehicle conditions, conditions around the vehicle, and the like. However, the results cannot be said to be fair to all vehicles using MSCS. This is because the essence of the service for the purpose of common benefit cannot be achieved if resources are allocated to the same vehicle with an advantage in circumstances or conditions every time. That is, all vehicles using MSCS should be serviced at appropriate opportunities and at appropriate times. Therefore, if the resource conflict occurs, resource allocation should be determined based on various data such as circumstances or conditions, but what should be considered here is fairness of resource allocation.

Fairness in MSCS may be defined as having an equal opportunity for all vehicles contending for a specific resource to execute an intended maneuver. That is, resources should be allocated without bias to any specific vehicle anytime, anywhere through the equal opportunity. In order for resource allocation not to be biased, the ratio of resource allocation success to manipulation intention request (success/winning rate) of the vehicle should be maintained at an equal or similar level for each vehicle.

Each existing standard organization and V2X related organization provide a method for resource allocation in case of resource conflict in MSCS. However, it is stated that the resource allocation is determined in consideration of priorities, vehicle conditions, conditions around the vehicle, and the like, but no specific method or data is provided. Or, it is simply stated that resources are allocated under mutual coordination. This content alone cannot solve two typical potential problems:

(1) Dominating resource allocation of a specific vehicle: In case that multiple vehicles contend for the same road resource, if the resource allocation is determined in consideration of priorities allocated in advance, vehicle conditions, conditions around the vehicle, and the like, a case in which the resource allocation is repeatedly performed to one specific vehicle may occur.

(2) Impossible resource allocation for all vehicles: In case that multiple vehicles contend for the same road resource, if a host vehicle (HV) and remote vehicles (RVs) negotiates or coordinates the winner for the resource allocation based on different resource allocation criteria, different winners may be repeatedly derived. In this case, the negotiation or the coordination may not be complete, and a situation may occur in which no vehicle can use the resource.

That is, in the case of (1) above, fair resource allocation was not achieved, and in the case of (2) above, a specific and identical resource conflict resolution algorithm (hereinafter referred to as CRA) may be required between HVs and RVs.

In order to solve the above-described problem, based on various embodiments of the present disclosure, proposed are a method for fair resource allocation in MSCS borrowing a concept of a token bucket traffic shaper (hereinafter referred to as a token bucket) in a network field and a device supporting the same. The token bucket is a traffic control method for monitoring (policing) and maintaining (shaping) traffic (e.g., transmission volume) constant when transmitting data on a network. Based on the token bucket, data cells to be transmitted may be contained in a buffer, and the data cells in the buffer may be transmitted as many as the number of tokens contained in the bucket. That is, in order to transmit n data cells in the buffer on the network, data may be transmitted as many as n tokens in the bucket, and token(s) used for transmission may be consumed. In addition, tokens may be stacked back into the bucket at a rate over time, and through this, data cells in the buffer may be transmitted. That is, the maximum size of data that can be transmitted at one time on the network may be the same as the size of the bucket, and data cannot be transmitted when there is no token in the bucket. Accordingly, by adjusting the rate at which tokens are generated, the rate or amount of transmitted data may be adjusted.

Based on various embodiments of the present disclosure, proposed are a method for properly allocating resources, by granting tokens to each vehicle based on the token bucket to give an opportunity to use resources and by reflecting the fairness of resource allocation based on tokens when the resource conflict occurs between contending vehicles, and a device supporting the same are proposed.

As described above, the role of tokens proposed in various embodiments of the present disclosure may refer to an opportunity for each vehicle to use resources by transmitting an intended maneuver. That is, a vehicle having many tokens may have a high probability of executing a manipulation intention. In other words, the probability that a vehicle with more tokens can execute a manipulation intention may be higher than the probability that a vehicle with few tokens can execute a manipulation intention. For example, if a vehicle attempts to execute a manipulation intention, and if the manipulation intention is successfully executed, token(s) may be consumed. Therefore, the probability of executing the next manipulation intention of the vehicle that has successfully executed the manipulation intention may be lowered, i.e., a trade-off relationship.

In case that a vehicle requests each manipulation intention, the vehicle may determine how many tokens to use for the request among tokens contained in the bucket, and the vehicle may transmit a request message by including the number of tokens to be used. For example, the token(s) may be consumed immediately upon execution of the manipulation, and the token(s) may be re-created in the bucket at a rate over time. For example, a plurality of contending vehicles "A" and "B" that intend to simultaneously use the same resource (e.g., road resource, hereinafter, the resource may include a road resource (RR) or a time-frequency resource), "A" may transmit by specifying the number of tokens to be used when requesting the intended maneuver. Then, "B" may compare the request for manipulation intention (e.g., the number of tokens that "A" intends to use) received from "A" with the number of tokens that "B" intends to use. In this case, if the number of tokens that "B" intends to use is less than the number of tokens that "A" intends to use, "B" may allow the request of "A". If the number of tokens that "B" intends to use is equal to or greater than the number of tokens that "A" intends to use, "B" may reject the request of "A". However, since a method of determining the number of tokens to be used is a matter of implementation, various embodiments of the present disclosure may not be limited to a specific implementation example of determining the number of tokens to be used. Furthermore, a method for determining the number of tokens to be used, premised/including the above technical features, may be in improvement relationship with various embodiments of the present disclosure.

Figure 11:
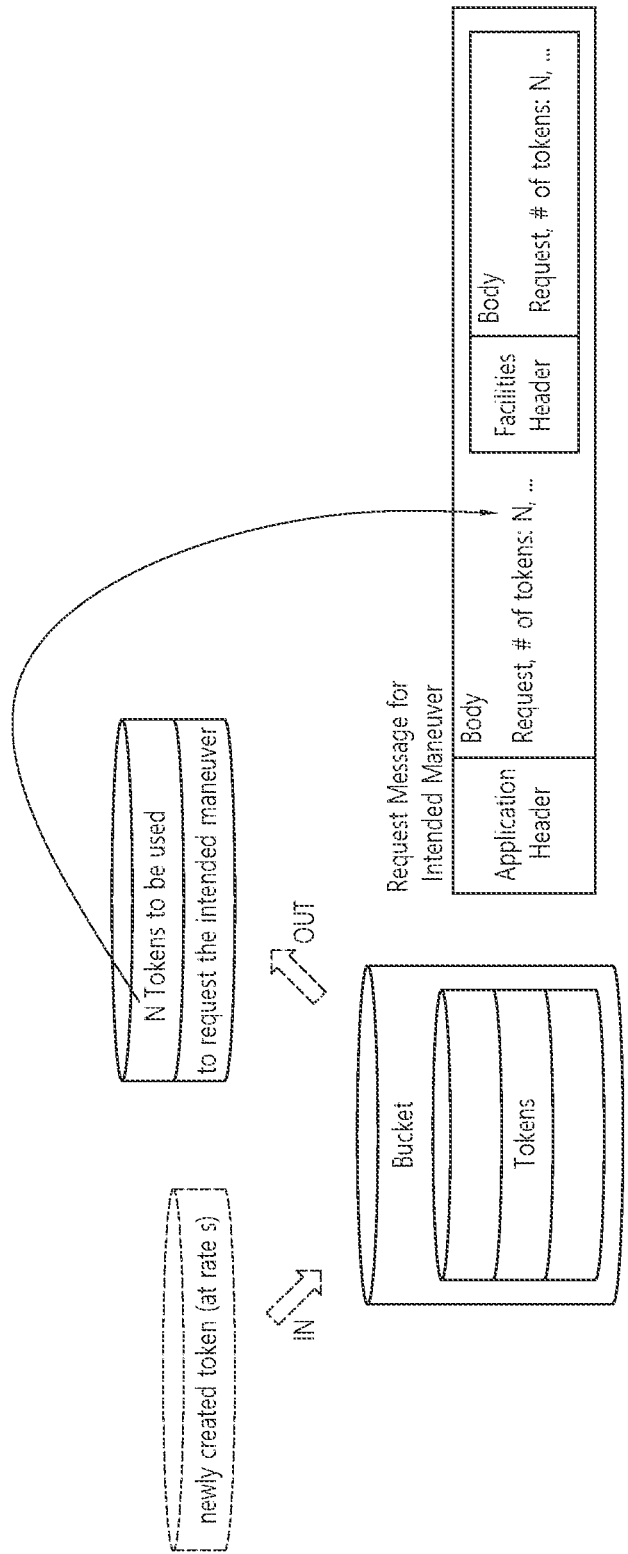
FIG. 11 shows a request message for a token, a bucket, and a manipulation intention, based on an embodiment of the present disclosure.

FIG. 11 shows a request message for a token, a bucket, and a manipulation intention, based on an embodiment of the present disclosure. The embodiment of FIG. 11 may be combined with various embodiments of the present disclosure.

Referring to FIG. 11, a token may be generated based on a token creation rate, and the token may be stored in a bucket. For example, if a vehicle determines to use N tokens to perform a specific manipulation intention, a request message for the specific manipulation intention may include information related to the N tokens (i.e., information representing that the vehicle will use N tokens to perform the specific manipulation intention). In addition, the vehicle may transmit the request message fir the specific manipulation intention.

For example, depending on the implementation location of a service and a token bucket, the token bucket and related data may be included in the body of a message generated in an application layer or a facility layer.

Various embodiments of the present disclosure may be implemented in an application layer or a facility layer corresponding to a higher layer of an architecture of European Telecommunications Standards Institute (ETSI) Intelligent Transport Systems (ITS). Furthermore, various embodiments of the present disclosure are not limited or restricted to be implemented in a specific layer.

Figure 12:
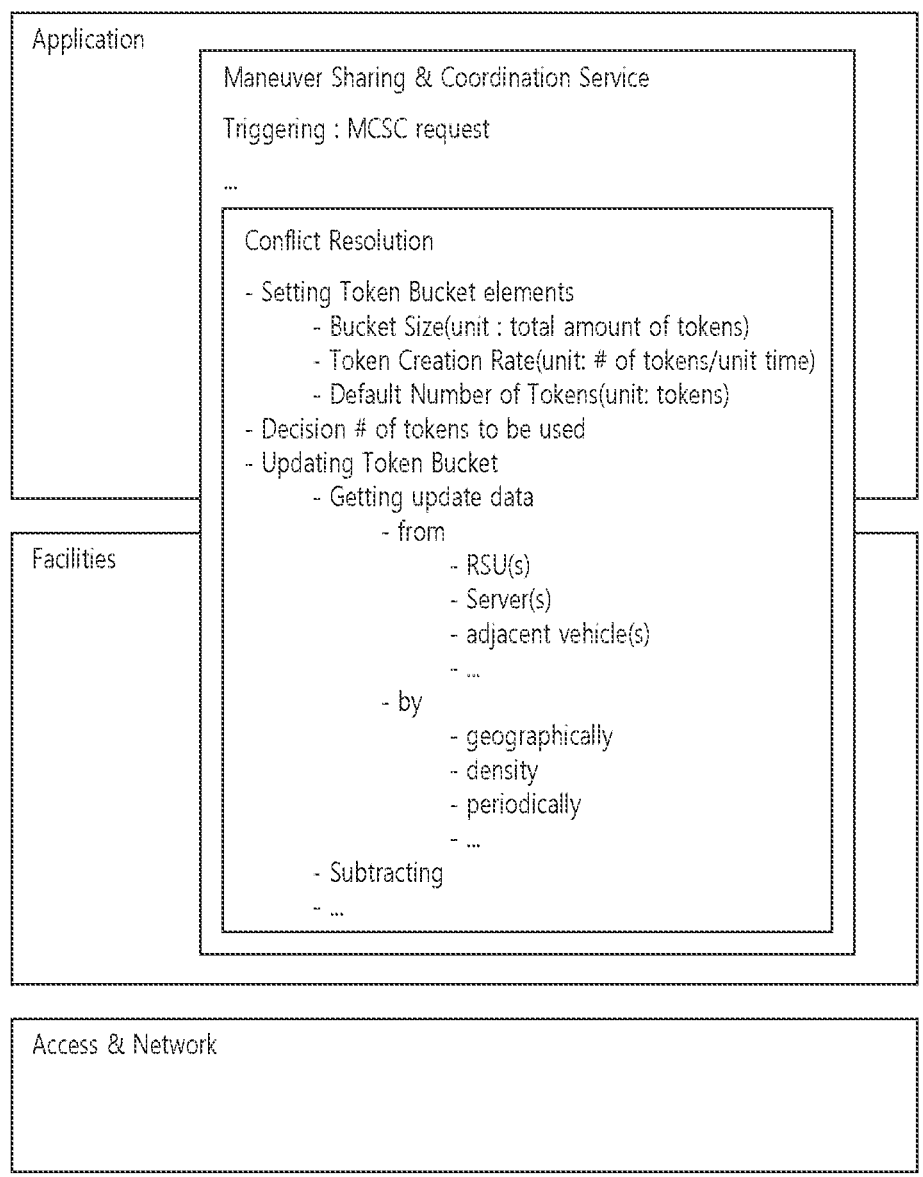
FIG. 12 shows the implementation location and role of a token bucket based on an ETSI ITS architecture, based on an embodiment of the present disclosure.

FIG. 12 shows the implementation location and role of a token bucket based on an ETSI ITS architecture, based on an embodiment of the present disclosure. The embodiment of FIG. 12 may be combined with various embodiments of the present disclosure.

The most important principle of the guarantee of fairness in the token bucket method may be the opportunity cost for using the token. By adjusting the bucket size and the token creation rate based on the guarantee of fairness in the token bucket method, flexible resource allocation considering vehicle and road environments may also be possible.

For example, a situation in which vehicles are very complex in an urban area may be considered a relatively competitive situation, and thus values of the bucket size and the token creation rate may be decreased. Through this, since the chance of basic manipulation intention can be decreased due to the limited amount of tokens, it can be changed to a not competitive situation. On the other hand, for example, in a rural area with low vehicle density, values of the bucket size and the token creation rate may be increased. Through this, since the chance of basic manipulation intention can be increased, the intention of the driver and the vehicle can be fully used. This is because where there is no intention or competition, it is appropriate to guarantee the maximum possible basic autonomy of the vehicle or its owner, if competition occurs due to intention and fairness is required due to the competition.

For example, values of the bucket size and the token creation rate of an emergency vehicle may be configured to be larger than values of the bucket size and the token creation rate of a general vehicle. In this case, a manipulation intention of the emergency vehicle can be accepted with high probability in critical situations.

Based on the token bucket method of the present disclosure, flexible resource allocation may be possible according to changes in environments and circumstances based on fairness, by adjusting the bucket size and the token creation rate according to geographical/locational characteristics, a vehicle density, a vehicle priority, etc. Basically, the token creation rate and the bucket size in an embodiment may not be limited or restricted to a quantitative value. For example, system manufacturers, service providers, etc. may apply/set the token creation rate and the bucket size to any number appropriate to characteristics of a vehicle, a region, an environment, etc., or a service provision policy, and through this, the token creation rate and the bucket size may be different.

Figure 13:
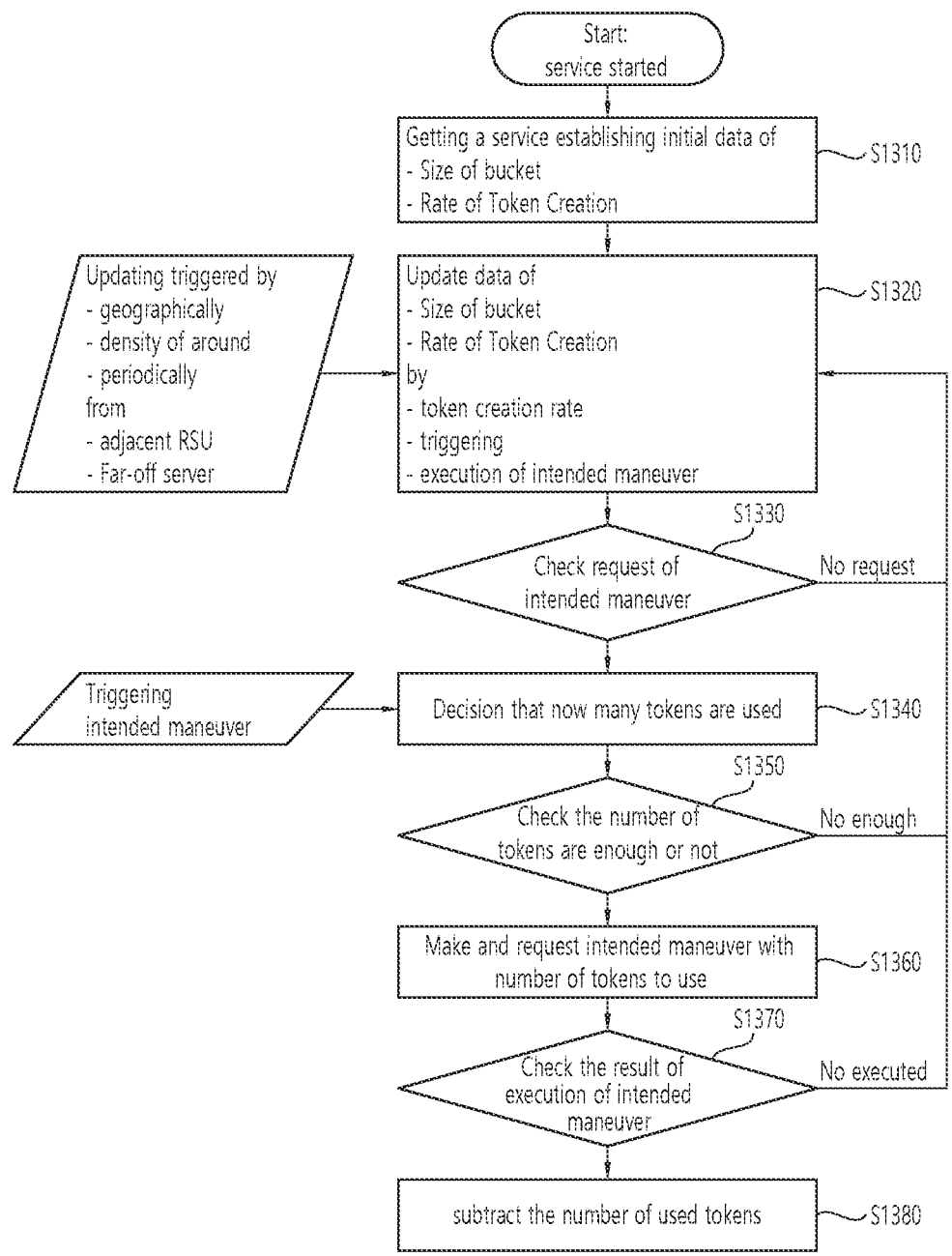
FIG. 13 shows a specific resource allocation procedure based on a token bucket operating in MSCS, based on an embodiment of the present disclosure.

FIG. 13 shows a specific resource allocation procedure based on a token bucket operating in MSCS, based on an embodiment of the present disclosure. The embodiment of FIG. 13 may be combined with various embodiments of the present disclosure.

Referring to FIG. 13, in step S1310, a first device may configured/set to token bucket data. For example, the first device may be a vehicle, a device included in the vehicle, a device installed in the vehicle, etc. For example, if a system and a service are started, at least one of a bucket size, a token creation rate, and/or the number of tokens may be configured/set to a default value. Thereafter, at least one of the bucket size, the token creation rate, and/or the number of tokens may be updated according to the following update conditions.

In step S1320, the first device may update at least one of the bucket size, the token creation rate, and/or the number of tokens.

For example, the first device may update the number of tokens. For example, based on the token creation rate, the first device may add as many tokens as the token creation rate to the initially configured/set number of tokens. For example, the first device may add newly generated tokens according to the token creation rate to a bucket. For example, it is assumed that the bucket size is 10 tokens, the token creation rate is 1 token/hour, and the bucket contains 5 tokens by default when the system/service is started. In this case, if the first device has not used a token for 1 hour, 1 token may be added to the bucket. Thus, 6 tokens may exist in the bucket. Thereafter, if the first device uses 3 tokens of the 6 tokens and 3 tokens remains in the bucket, 1 token may be additionally generated after 1 hour, and thus 4 tokens may exist in the bucket.

For example, at least one of the bucket size, the token creation rate, and/or the number of tokens may be updated for reasons such as regional causes (regional characteristics), the density of surrounding vehicles, the arrival of periodic update timing, etc. For example, the update may be triggered by a nearby RSU, a far-off server, etc. For example, the update may be triggered by the first device.

For example, at least one of the bucket size, the token creation rate, and/or the number of tokens may be updated based on regional causes (e.g., regional characteristics). For example, in the case of a first region in which congestion frequently occurs during a specific time period, at least one of the bucket size, the token creation rate, and/or the number of tokens of the first device belonging to the first region may be updated to a small value during the specific time period. For example, in the case of a second region in which congestion does not occur, at least one of the bucket size, the token creation rate, and/or the number of tokens of the first device belonging to the second region may be updated to a large value. For example, in the case of a first region in which congestion does not occur during a specific time period, at least one of the bucket size, the token creation rate, and/or the number of tokens of the first device belonging to the first region may be updated to a large value during the specific time period.

For example, at least one of the bucket size, the token creation rate, and/or the number of tokens may be updated based on a vehicle density around the first device. For example, the first device may obtain the vehicle density based on a sensor installed in the first device. For example, the first device may receive at least one of a cooperative awareness message (CAM), a basic safety message (BSM), a collective perception message (CPM), and/or a sensor data sharing message (SDSM) from another device, and the first device may obtain the vehicle density based on the message(s). For example, the first device may measure CBR, and the first device may obtain the vehicle density based on the CBR. For example, the first device may receive information related to the vehicle density from a network (e.g., base station, RSU, or server). For example, if the vehicle density is high, at least one of the bucket size, the token creation rate, and/or the number of tokens may be updated to a small value. For example, if the vehicle density is low, at least one of the bucket size, the token creation rate, and/or the number of tokens may be updated to a large value.

For example, at least one of the bucket size, the token creation rate, and/or the number of tokens may be updated when a periodic update period arrives.

For example, at least one of the bucket size, the token creation rate, and/or the number of tokens may be updated based on a priority (e.g., vehicle priority). For example, at least one of the bucket size, the token creation rate, and/or the number of tokens of a vehicle with a high priority may be updated to a large value. For example, at least one of the bucket size, the token creation rate, and/or the number of tokens of a vehicle with a low priority may be updated to a small value. For example, when an emergency vehicle drives in a general situation, the emergency vehicle may be configured/set to a low priority, and at least one of the bucket size, the token creation rate, and/or the number of tokens of the emergency vehicle may be updated to a small value. On the other hand, for example, when an emergency vehicle drives in an emergency situation, the emergency vehicle may be configured/set to a high priority, and at least one of the bucket size, the token creation rate, and/or the number of tokens of the emergency vehicle may be updated to a large value.

For example, at least one of the bucket size, the token creation rate, and/or the number of tokens may be autonomously updated by the first device. In this case, the first device may update at least one of the bucket size, the token creation rate, and/or the number of tokens based on the above conditions.

Alternatively, for example, at least one of the bucket size, the token creation rate, and/or the number of tokens may be updated by a network (e.g., base station, RSU or server), and the network may transmit the updated information to the first device. In this case, the network (e.g., base station, RSU or server) may update at least one of the bucket size, the token creation rate, and/or the number of tokens based on the above conditions, and the network may transmit the updated information to the first device.

Additionally, for example, the first device may perform a request of a manipulation intention and token transmission. For example, in step S1330, if the request to execute the manipulation intention occurs, in step S1340, the system (e.g., first device) may first determine the number of tokens to be used for the request, and in step S1350, the system (e.g., first device) may check if more than the number of tokens remain in the bucket. For example, in step S1360, the first device may transmit a request message only if more than the number of tokens remain in the bucket. Otherwise, the first device may transmit a request message. For example, the number of tokens to be used may vary depending on the policy of the system manufacturer or the service provider depending on the importance or frequency of the manipulation intention.

Additionally, for example, the first device may perform the manipulation intention and reduce the token(s). For example, if the number of tokens to be used remains, that is, in the case of the first device (e.g., system) having an opportunity to execute the manipulation intention, in step S1360, the first device may transmit a request message for the manipulation intention. For example, in step S1370, if the first device is allocated resources by receiving permission to use the resources from contending vehicle(s) and finally performs the manipulation, in step S1380, the corresponding token(s) may be deducted from the bucket. For example, due to the execution of the manipulation intention, the token(s) may be decremented. For example, the token(s) used by the first device to obtain an opportunity of the manipulation intention may be destroyed when the manipulation intention leads to actual execution. After that, until the first device has an opportunity to execute the manipulation intention again according to the token creation rate, the first device cannot transmit a request of the manipulation intention.

Figure 14:
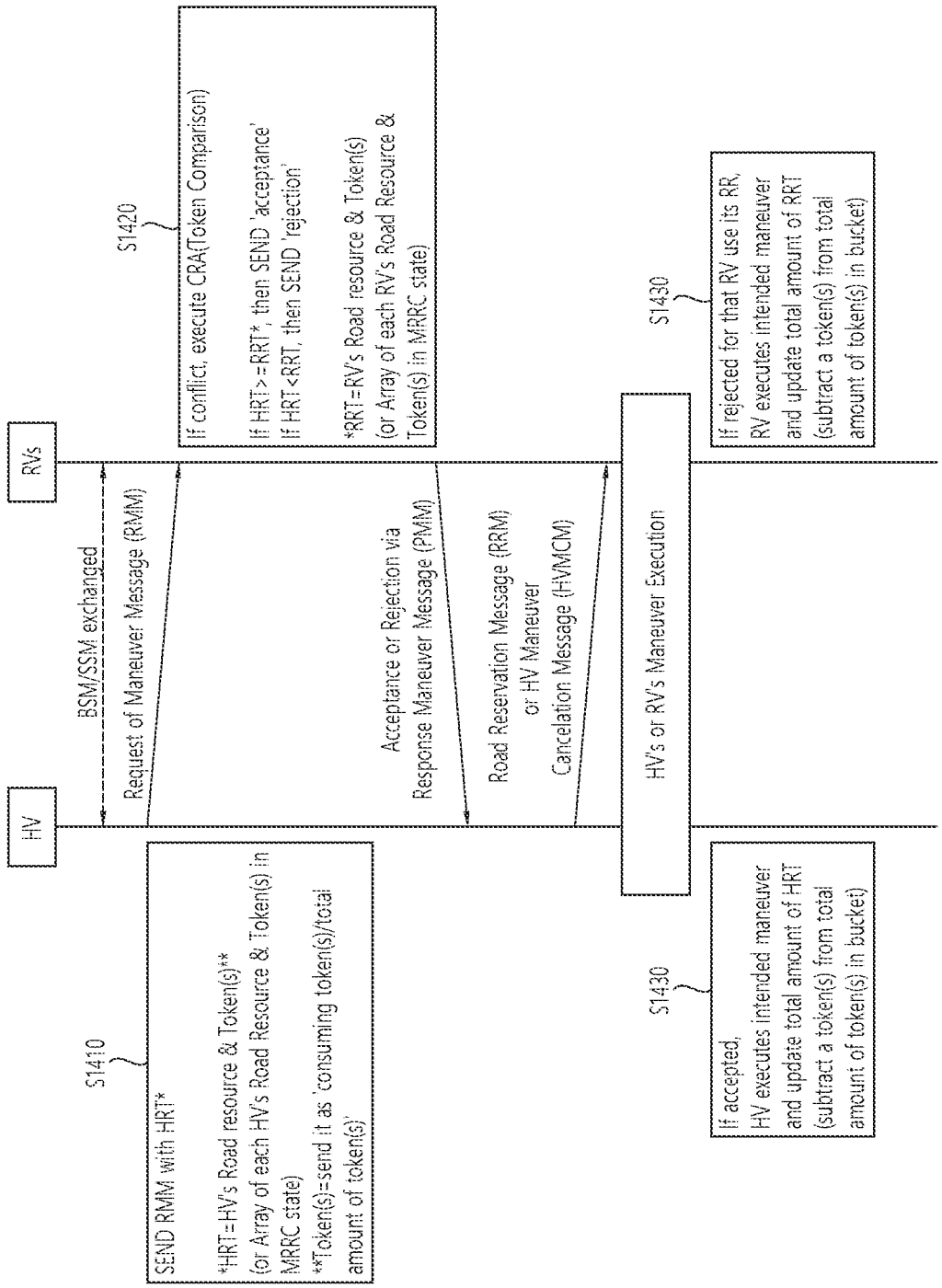
FIG. 14 shows a procedure for transmitting and receiving a message between a host vehicle (HV) and remote vehicles (RVs), based on an embodiment of the present disclosure.

FIG. 14 shows a procedure for transmitting and receiving a message between a host vehicle (HV) and remote vehicles (RVs), based on an embodiment of the present disclosure. The embodiment of FIG. 14 may be combined with various embodiments of the present disclosure.

Referring to FIG. 14, in step S1410, when the HV transmits a request message for a manipulation intention (hereinafter referred to as RMM), the HV may transmit information related to the number of tokens to be used for road resources (RR) together. For example, the HV may transmit a request message (e.g., MAC PDU) for the manipulation intention including information related to the number of tokens to be used for occupation of road resources. If there are a plurality of road resources, the number of tokens to be used by the HV may be transmitted for each road resource. In this case, when the RV that has received the RMM wants to use the resource, a collision problem with respect to resource allocation may occur. In order to resolve such the collision of resource allocation, a winner determination may be required, and the winner may be determined by the number of tokens. That is, a vehicle that intends to use more tokens for the conflicted resource may be determined as the winner.

In step S1420, the RV may transmit a response maneuver message (PMM). For example, if the HV is the winner, the RV may transmit a PMM related to permission or acceptance. Alternatively, for example, if the RV itself is the winner, the RV may transmit a PMM related to rejection.

In step S1430, the HV which has received the PMM related to permission or acceptance from the RV may determine that it can use the specific resource. In addition, if the final manipulation execution occurs, the HV may reduce the number of tokens transmitted in the request in its own bucket.

Figure 15:
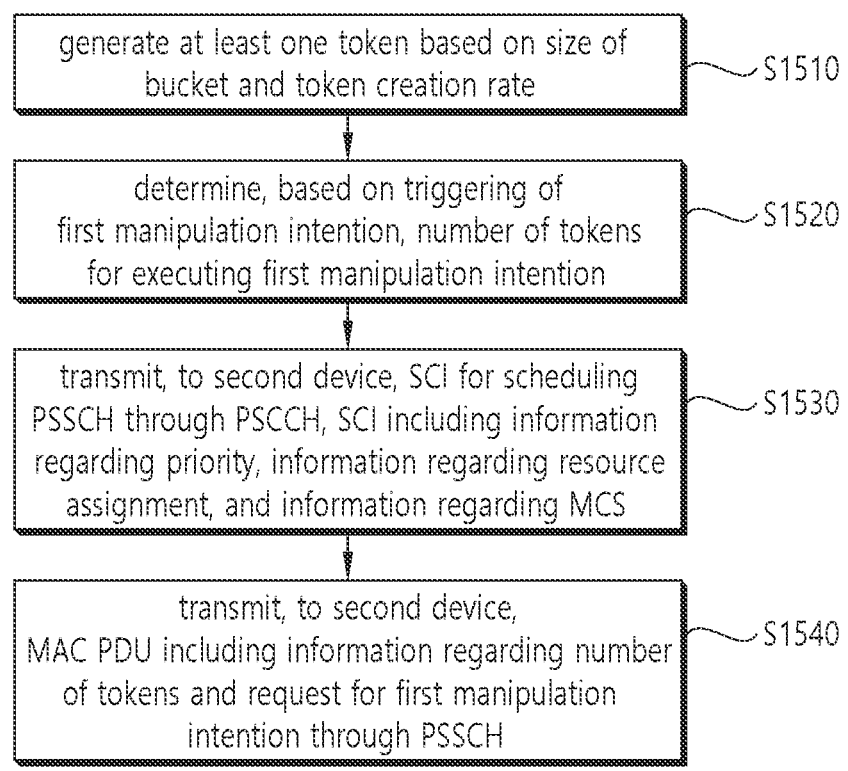
FIG. 15 shows a method for a first device to perform wireless communication, based on an embodiment of the present disclosure.

FIG. 15 shows a method for a first device to perform wireless communication, based on an embodiment of the present disclosure. The embodiment of FIG. 15 may be combined with various embodiments of the present disclosure.

Referring to FIG. 15, in step S1510, the first device may generate at least one token based on a size of a bucket and a token creation rate. In step S1520, the first device may determine, based on a triggering of a first manipulation intention, a number of tokens for executing the first manipulation intention. In step S1530, the first device may transmit, to a second device, sidelink control information (SCI) for scheduling a physical sidelink shared channel (PSSCH) through a physical sidelink control channel (PSCCH). For example, the SCI may include information regarding a priority, information regarding resource assignment, and information regarding modulation and coding scheme (MCS). In step S1540, the first device may transmit, to the second device, a medium access control (MAC) protocol data unit (PDU) including information regarding the number of tokens and a request for the first manipulation intention through the PSSCH.

For example, a resource to be occupied by the first manipulation intention of the first device may overlap a resource to be occupied by a second manipulation intention of the second device. For example, the size of the bucket may be a maximum number of tokens that can be stored in the bucket.

Additionally, for example, the first device may receive, from the second device, acceptance information for the request, based on that a number of tokens for executing a second manipulation intention of the second device is less than the number of tokens for executing the first manipulation intention. Additionally, for example, the first device may execute the first manipulation intention based on the acceptance information. In this case, a number of tokens stored in the bucket may be deducted by the number of tokens for executing the first manipulation intention.

Additionally, for example, the first device may receive, from the second device, rejection information for the request, based on that a number of tokens for executing a second manipulation intention of the second device is greater than the number of tokens for executing the first manipulation intention. In this case, for example, based on the rejection information, the first manipulation intention may not be executed, and a number of tokens stored in the bucket may not be deducted.

Additionally, for example, the first device may receive, from the second device, acceptance information for the request, based on that a number of tokens for executing a second manipulation intention of the second device is equal to the number of tokens for executing the first manipulation intention.

For example, the size of the bucket or the token creation rate may be determined based on congestion level. For example, a size of a bucket or a token creation rate related to high congestion level may be smaller than a size of a bucket or a token creation rate related to low congestion level. For example, the congestion level may include vehicle density or channel busy ratio (CBR).

For example, the size of the bucket or the token creation rate may be determined based on a priority of the first device. For example, a size of a bucket or a token creation rate of a device with a high priority may be greater than a size of a bucket or a token creation rate of a device with a low priority.

For example, the size of the bucket or the token creation rate may be determined based on characteristics of a region. For example, a size of a bucket or a token creation rate related to a region with a high congestion level may be smaller than a size of a bucket or a token creation rate related to a region with a low congestion level.

For example, the size of the bucket and the token creation rate may be determined by the first device.

For example, information related to the size of the bucket and information related to the token creation rate may be received from a third device. For example, the third device may include at least one of a road side unit (RSU), a server, and a network.

For example, the information related to the size of the bucket and the information related to the token creation rate received from the third device may be prioritized over information related to the size of the bucket and information related to the token creation rate determined by the first device. For example, if the first device, which has determined the size of the bucket and the token creation rate autonomously, receives information related to the size of the bucket and information related to the token creation rate from the third device, the first device may preferentially use the information related to the size of the bucket and the information related to the token creation rate received from the third device, and the first device may ignore the size of the bucket and the token creation rate determined by the first device.

The proposed method can be applied to the device(s) based on various embodiments of the present disclosure. First, the processor 102 of the first device 100 may generate at least one token based on a size of a bucket and a token creation rate. In addition, the processor 102 of the first device 100 may determine, based on a triggering of a first manipulation intention, a number of tokens for executing the first manipulation intention. In addition, the processor 102 of the first device 100 may control the transceiver 106 to transmit, to a second device, sidelink control information (SCI) for scheduling a physical sidelink shared channel (PSSCH) through a physical sidelink control channel (PSCCH). For example, the SCI may include information regarding a priority, information regarding resource assignment, and information regarding modulation and coding scheme (MCS). In addition, the processor 102 of the first device 100 may control the transceiver 106 to transmit, to the second device, a medium access control (MAC) protocol data unit (PDU) including information regarding the number of tokens and a request for the first manipulation intention through the PSSCH.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: generate at least one token based on a size of a bucket and a token creation rate; determine, based on a triggering of a first manipulation intention, a number of tokens for executing the first manipulation intention; transmit, to a second device, sidelink control information (SCI) for scheduling a physical sidelink shared channel (PSSCH) through a physical sidelink control channel (PSCCH), wherein the SCI includes information regarding a priority, information regarding resource assignment, and information regarding modulation and coding scheme (MCS); and transmit, to the second device, a medium access control (MAC) protocol data unit (PM) including information regarding the number of tokens and a request for the first manipulation intention through the PSSCH.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: generate at least one token based on a size of a bucket and a token creation rate; determine, based on a triggering of a first manipulation intention, a number of tokens for executing the first manipulation intention; transmit, to a second UE, sidelink control information (SCI) for scheduling a physical sidelink shared channel (PSSCH) through a physical sidelink control channel (PSCCH), wherein the SCI includes information regarding a priority, information regarding resource assignment, and information regarding modulation and coding scheme (MCS); and transmit, to the second UE, a medium access control (MAC) protocol data unit (PDU) including information regarding the number of tokens and a request for the first manipulation intention through the PSSCH.

Based on an embodiment of the present disclosure, a non-transitory computer-readable storage medium storing instructions may be provided. For example, the instructions, when executed, may cause a first device to: generate at least one token based on a size of a bucket and a token creation rate; determine, based on a triggering of a first manipulation intention, a number of tokens for executing the first manipulation intention; transmit, to a second device, sidelink control information (SCI) for scheduling a physical sidelink shared channel (PSSCH) through a physical sidelink control channel (PSCCH), wherein the SCI includes information regarding a priority, information regarding resource assignment, and information regarding modulation and coding scheme (MCS); and transmit, to the second device, a medium access control (MAC) protocol data unit (PDU) including information regarding the number of tokens and a request for the first manipulation intention through the PSSCH.

Figure 16:
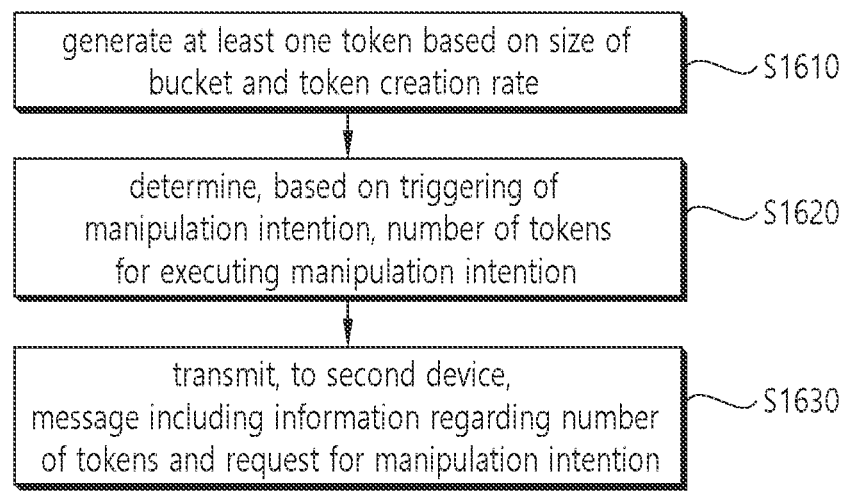
FIG. 16 shows a method for a first device to perform wireless communication, based on an embodiment of the present disclosure.

FIG. 16 shows a method for a first device to perform wireless communication, based on an embodiment of the present disclosure. The embodiment of FIG. 16 may be combined with various embodiments of the present disclosure.

Referring to FIG. 16, in step S1610, the first device may generate at least one token based on a size of a bucket and a token creation rate. In step S1620, the first device may determine, based on a triggering of a manipulation intention, a number of tokens for executing the manipulation intention. In step S1630, the first device may transmit, to a second device, a message including information regarding the number of tokens and a request for the manipulation intention.

The proposed method can be applied to the device(s) based on various embodiments of the present disclosure. First, the processor 102 of the first device 100 may generate at least one token based on a size of a bucket and a token creation rate. In addition, the processor 102 of the first device 100 may determine, based on a triggering of a manipulation intention, a number of tokens for executing the manipulation intention. In addition, the processor 102 of the first device 100 may control the transceiver 106 to transmit, to a second device, a message including information regarding the number of tokens and a request for the manipulation intention.

Figure 17:
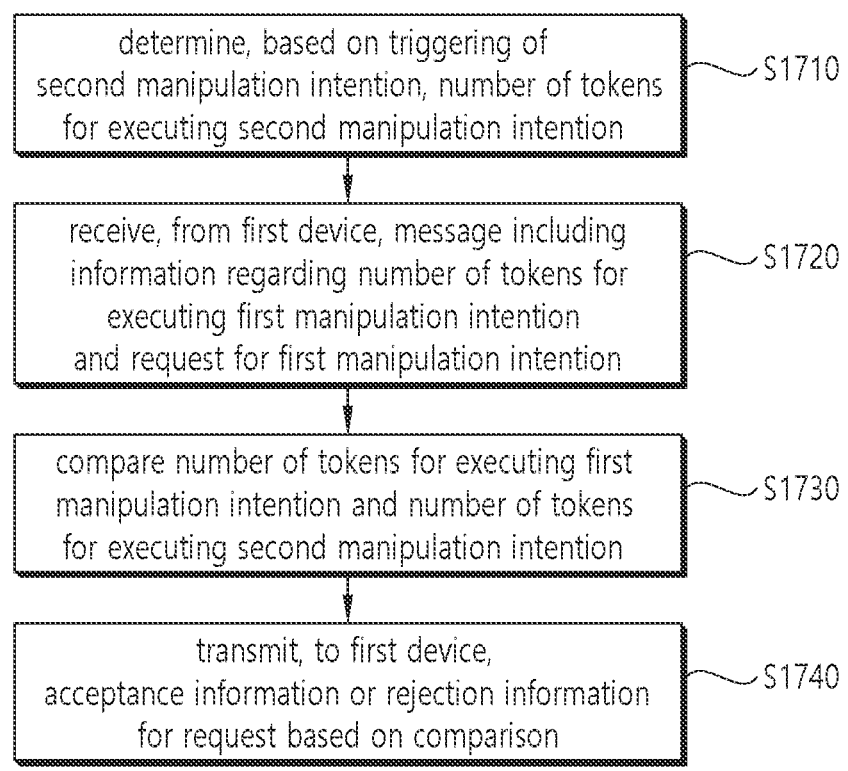
FIG. 17 shows a method for a second device to perform wireless communication, based on an embodiment of the present disclosure.

FIG. 17 shows a method for a second device to perform wireless communication, based on an embodiment of the present disclosure. The embodiment of FIG. 17 may be combined with various embodiments of the present disclosure.

Referring to FIG. 17, in step S1710, the second device may determine, based on a triggering of a second manipulation intention, a number of tokens for executing the second manipulation intention. In step S1720, the second device may receive, from a first device, a message including information regarding a number of tokens for executing a first manipulation intention and a request for the first manipulation intention. In step S1730, the second device may compare the number of tokens for executing the first manipulation intention and the number of tokens for executing the second manipulation intention. In step S1740, the second device may transmit, to the first device, acceptance information or rejection information for the request based on the comparison. For example, a resource to be occupied by the first manipulation intention of the first device may overlap a resource to be occupied by the second manipulation intention of the second device.

The proposed method can be applied to the device(s) based on various embodiments of the present disclosure. First, the processor 202 of the second device 200 may determine, based on a triggering of a second manipulation intention, a number of tokens for executing the second manipulation intention. In addition, the processor 202 of the second device 200 may control the transceiver 206 to receive, from a first device, a message including information regarding a number of tokens for executing a first manipulation intention and a request for the first manipulation intention. In addition, the processor 202 of the second device 200 may compare the number of tokens for executing the first manipulation intention and the number of tokens for executing the second manipulation intention. In addition, the processor 202 of the second device 200 may control the transceiver 206 to transmit, to the first device, acceptance information or rejection information for the request based on the comparison. For example, a resource to be occupied by the first manipulation intention of the first device may overlap a resource to be occupied by the second manipulation intention of the second device.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: determine, based on a triggering of a second manipulation intention, a number of tokens for executing the second manipulation intention; receive, from a first device, a message including information regarding a number of tokens for executing a first manipulation intention and a request for the first manipulation intention; compare the number of tokens for executing the first manipulation intention and the number of tokens for executing the second manipulation intention; and transmit, to the first device, acceptance information or rejection information for the request based on the comparison. For example, a resource to be occupied by the first manipulation intention of the first device may overlap a resource to be occupied by the second manipulation intention of the second device.

Based on an embodiment of the present disclosure, an apparatus adapted to control a second user equipment (UE) may be provided. For example, the apparatus may comprise: one or more processors; and one or more memories operably connected to the one or more processors and storing instructions. For example, the one or more processors may execute the instructions to: determine, based on a triggering of a second manipulation intention, a number of tokens for executing the second manipulation intention; receive, from a first UE, a message including information regarding a number of tokens for executing a first manipulation intention and a request for the first manipulation intention; compare the number of tokens for executing the first manipulation intention and the number of tokens for executing the second manipulation intention; and transmit, to the first UE, acceptance information or rejection information for the request based on the comparison. For example, a resource to be occupied by the first manipulation intention of the first UE may overlap a resource to be occupied by the second manipulation intention of the second UE.

Based on an embodiment of the present disclosure, a non-transitory computer-readable storage medium storing instructions may be provided. For example, the instructions, when executed, may cause a second device to: determine, based on a triggering of a second manipulation intention, a number of tokens for executing the second manipulation intention; receive, from a first device, a message including information regarding a number of tokens for executing a first manipulation intention and a request for the first manipulation intention; compare the number of tokens for executing the first manipulation intention and the number of tokens for executing the second manipulation intention; and transmit, to the first device, acceptance information or rejection information for the request based on the comparison. For example, a resource to be occupied by the first manipulation intention of the first device may overlap a resource to be occupied by the second manipulation intention of the second device.

Based on MSCS of the token bucket method proposed in various embodiments of the present disclosure, existing resource allocation problems that could not be solved with a clear and common standard can be solved. Specifically, the problem of a specific vehicle monopolizing resource allocation and the problem of not being able to allocate resources to all vehicles may not occur, and resources can be allocated fairly and transparently among contending vehicles in a clear and common solution. For example, since a vehicle that has already used up a lot of tokens has fewer tokens to use when requesting the next manipulation intention compared to other vehicles, resources can be fairly allocated among competing vehicles. For example, since at least one of the size of the bucket, the token creation rate, and/or the number of tokens may be set to a small value in a congested situation, resources can be fairly allocated among competing vehicles belonging to a congested region.

Various embodiments of the present disclosure can be implemented by various wireless communication technologies such as V2X, LTE V2X, NR V2X, dedicated short-range communications (DSRC), wireless access in vehicular environment (WAVE), etc.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
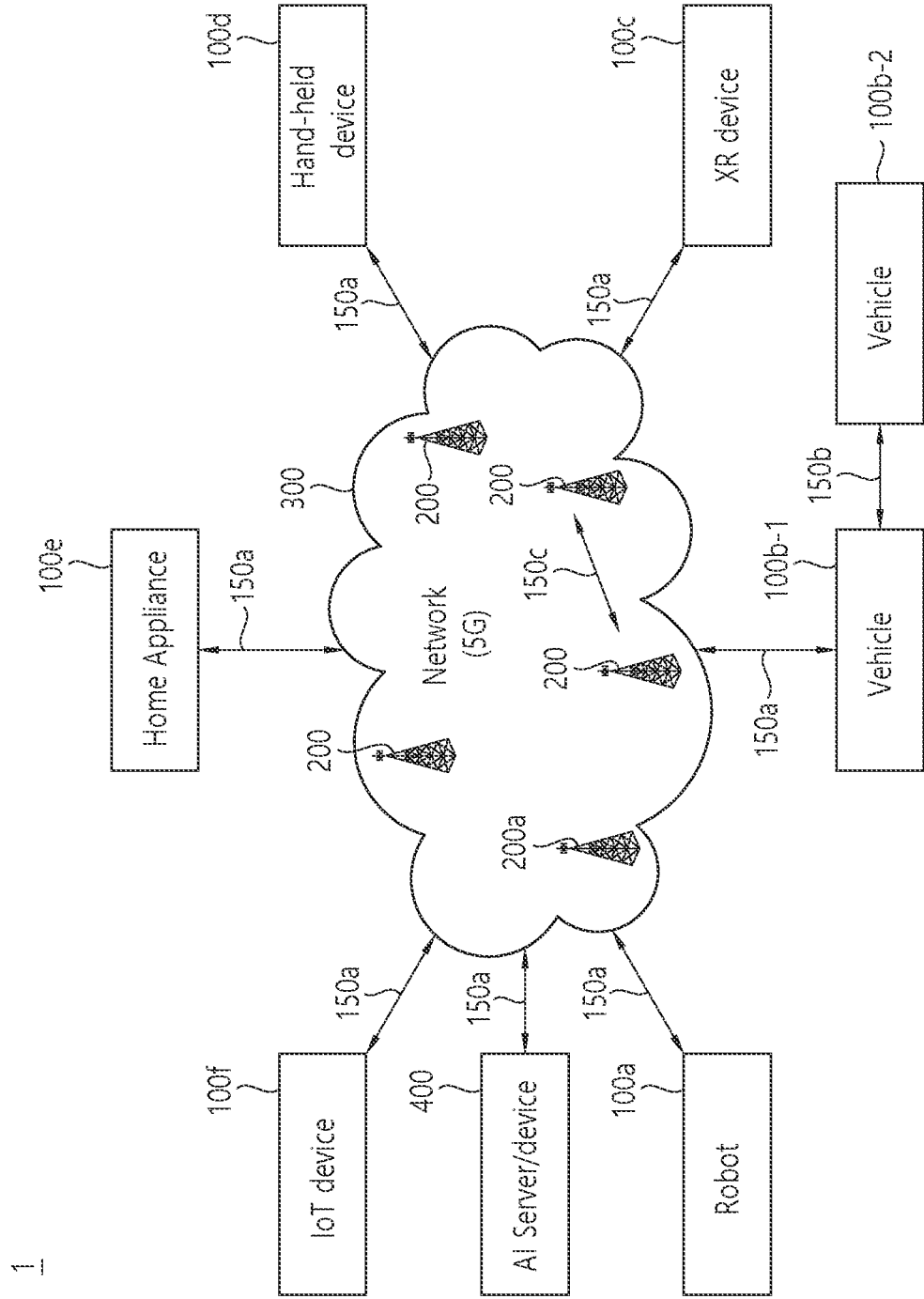
FIG. 18 shows a communication system 1, based on an embodiment of the present disclosure.

FIG. 18 shows a communication system 1, based on an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
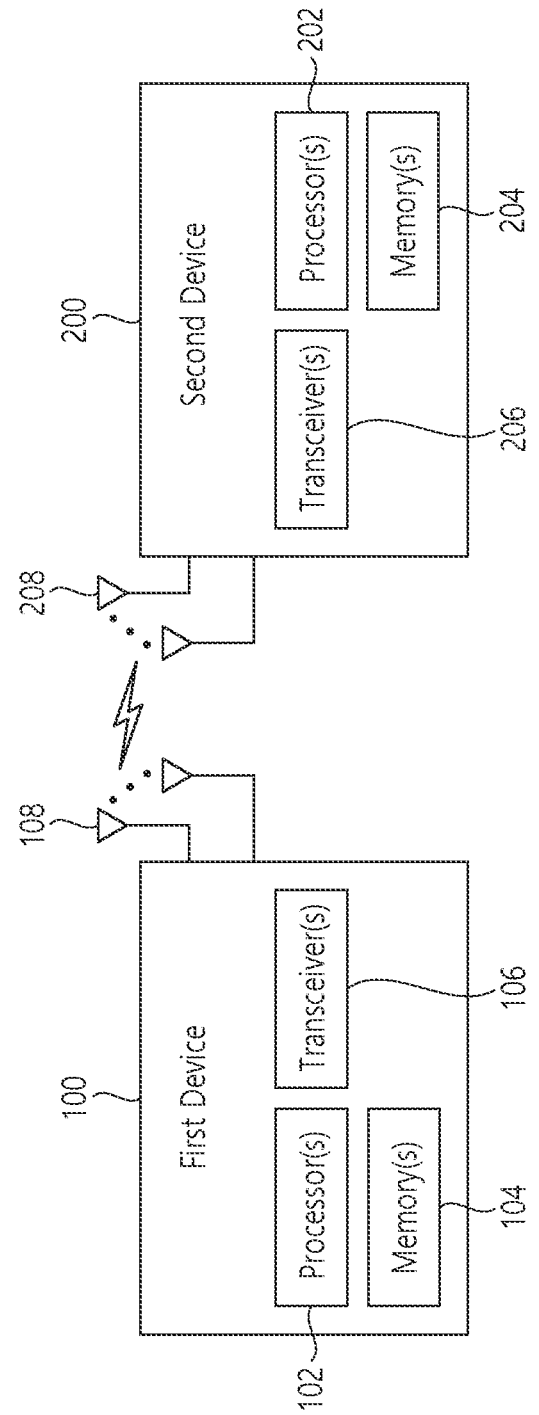
FIG. 19 shows wireless devices, based on an embodiment of the present disclosure.

FIG. 19 shows wireless devices, based on an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceivers) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceivers) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAM), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base hand signals into the RF band signals. To this end, the one or more transceivers 106 and 206 may include (analog) oscillators and/or filters.

Figure 20:
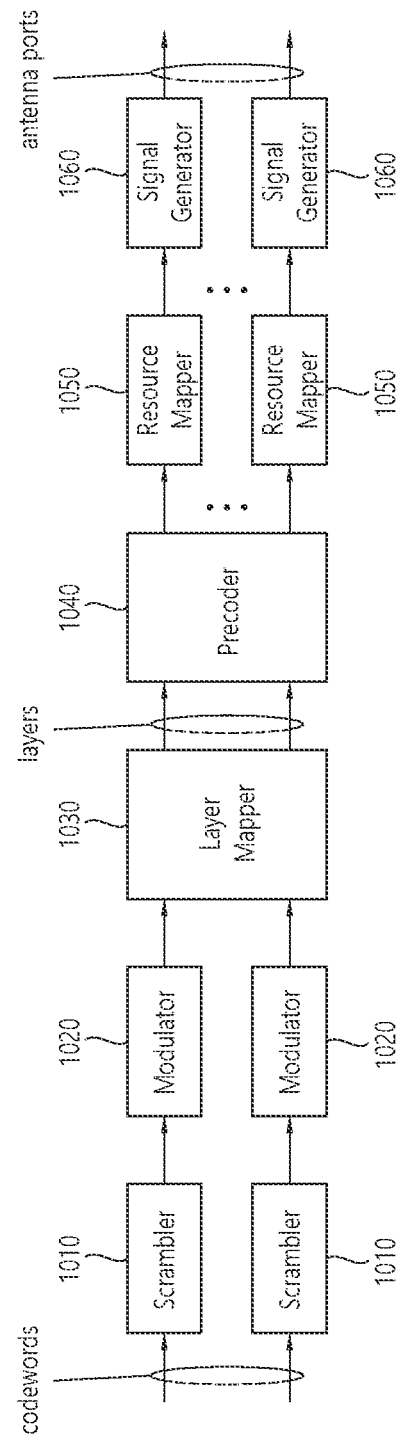
FIG. 20 shows a signal process circuit for a transmission signal, based on an embodiment of the present disclosure.

FIG. 20 shows a signal process circuit for a transmission signal, based on an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DAs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
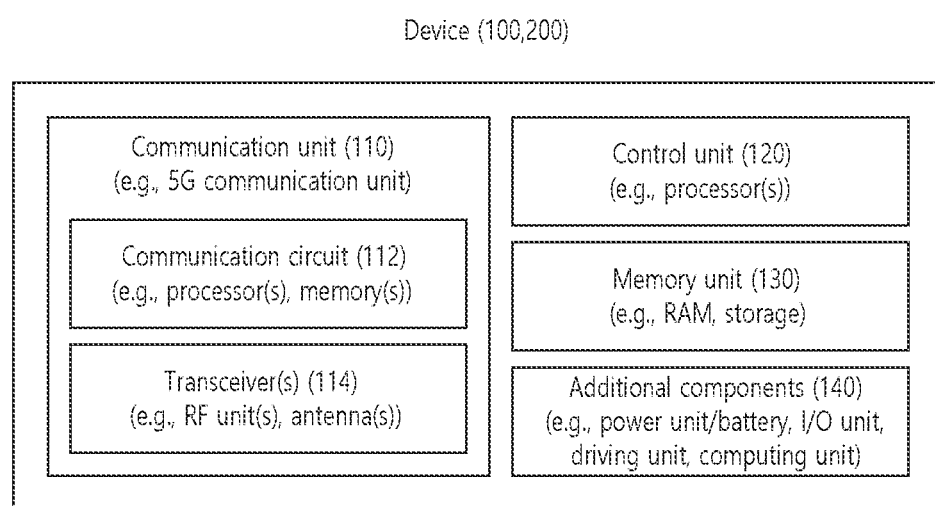
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 18), the vehicles (100*b*-1 and 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
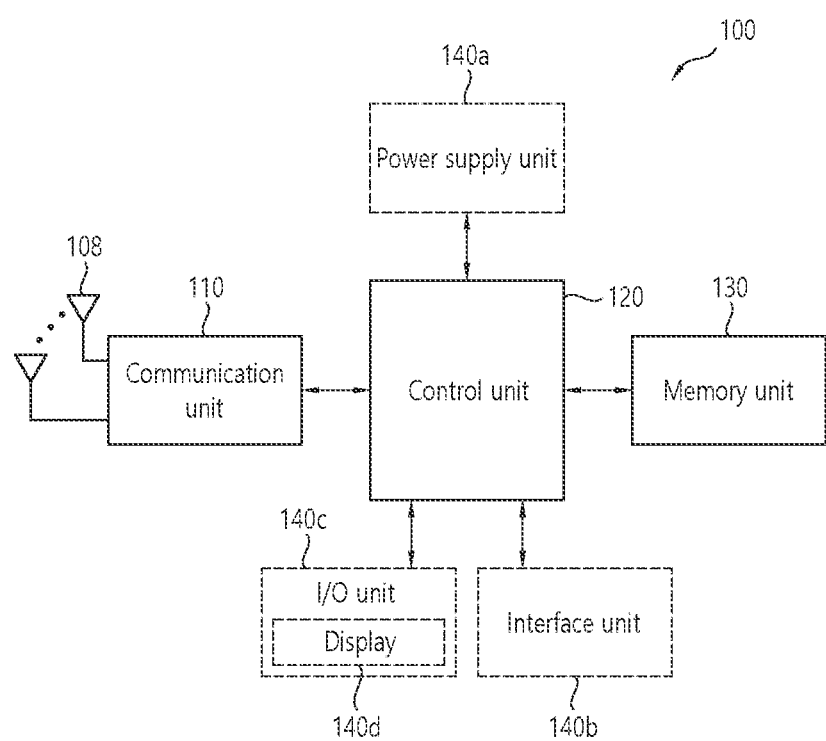
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 23:
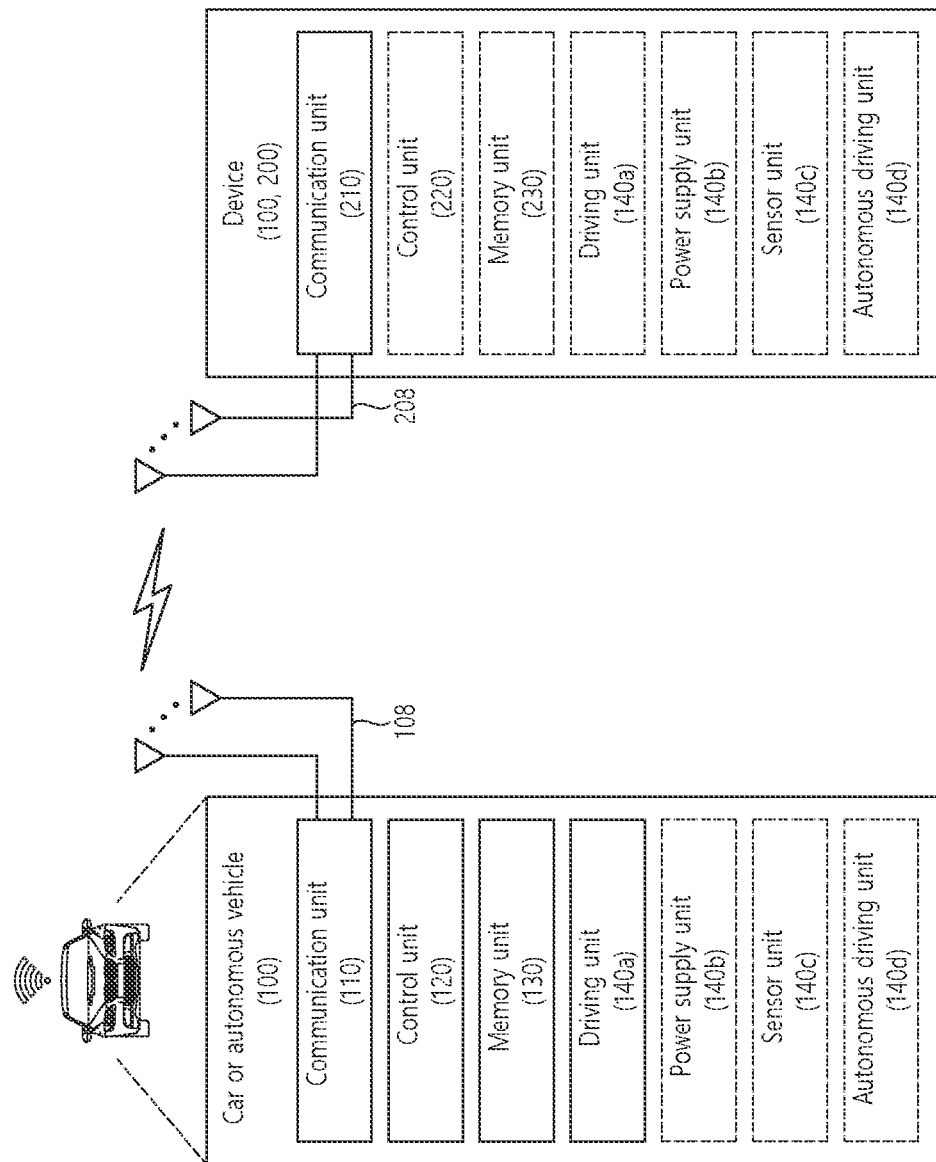
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first device, the method comprising:
   generating at least one token based on a size of a bucket and a token creation rate;
   determining, based on a triggering of a first manipulation intention, a number of tokens for executing the first manipulation intention;
   transmitting, to a second device, sidelink control information (SCI) for scheduling a physical sidelink shared channel (PSSCH) through a physical sidelink control channel (PSCCH), wherein the SCI includes information regarding a priority, information regarding resource assignment, and information regarding modulation and coding scheme (MCS); and
   transmitting, to the second device, a medium access control (MAC) protocol data unit (PDU) including information regarding the number of tokens and a request for the first manipulation intention through the PSSCH.

2. The method of claim 1, wherein a resource to be occupied by the first manipulation intention of the first device overlaps a resource to be occupied by a second manipulation intention of the second device.

3. The method of claim 1, wherein the size of the bucket is a maximum number of tokens that can be stored in the bucket.

4. The method of claim 1, further comprising:
   receiving, from the second device, acceptance information for the request, based on that a number of tokens for executing a second manipulation intention of the second device is less than the number of tokens for executing the first manipulation intention.

5. The method of claim 4, further comprising:
   executing the first manipulation intention based on the acceptance information,
   wherein a number of tokens stored in the bucket is deducted by the number of tokens for executing the first manipulation intention.

6. The method of claim 1, further comprising:
   receiving, from the second device, rejection information for the request, based on that a number of tokens for executing a second manipulation intention of the second device is greater than the number of tokens for executing the first manipulation intention.

7. The method of claim 6, wherein, based on the rejection information, the first manipulation intention is not executed, and a number of tokens stored in the bucket is not deducted.

8. The method of claim 1, further comprising:
   receiving, from the second device, acceptance information for the request, based on that a number of tokens for executing a second manipulation intention of the second device is equal to the number of tokens for executing the first manipulation intention.

9. The method of claim 1, wherein the size of the bucket or the token creation rate is determined based on congestion level.

10. The method of claim 9, wherein a size of a bucket or a token creation rate related to high congestion level is smaller than a size of a bucket or a token creation rate related to low congestion level.

11. The method of claim 9, wherein the congestion level includes vehicle density or channel busy ratio (CBR).

12. The method of claim 1, wherein the size of the bucket or the token creation rate is determined based on a priority of the first device.

13. The method of claim 12, wherein a size of a bucket or a token creation rate of a device with a high priority is greater than a size of a bucket or a token creation rate of a device with a low priority.

14. The method of claim 1, wherein the size of the bucket or the token creation rate is determined based on characteristics of a region.

15. The method of claim 14, wherein a size of a bucket or a token creation rate related to a region with a high congestion level is smaller than a size of a bucket or a token creation rate related to a region with a low congestion level.

16. The method of claim 1, wherein the size of the bucket and the token creation rate are determined by the first device.

17. The method of claim 1, wherein information related to the size of the bucket and information related to the token creation rate are received from a third device, and
   wherein the third device includes at least one of a road side unit (RSU), a server, and a network.

18. The method of claim 17, wherein the information related to the size of the bucket and the information related to the token creation rate received from the third device are prioritized over information related to the size of the bucket and information related to the token creation rate determined by the first device.

19. A first device, comprising:
at least one transceiver;
at least one processor; and
at least one memory connected to the at least one processor and storing instructions that, based on being executed, cause the first device to perform operations comprising:
generating at least one token based on a size of a bucket and a token creation rate;
determining, based on a triggering of a first manipulation intention, a number of tokens for executing the first manipulation intention;
transmitting, to a second device, sidelink control information (SCI) for scheduling a physical sidelink shared channel (PSSCH) through a physical sidelink control channel (PSCCH), wherein the SCI includes information regarding a priority, information regarding resource assignment, and information regarding modulation and coding scheme (MCS); and
transmitting, to the second device, a medium access control (MAC) protocol data unit (PDU) including information regarding the number of tokens and a request for the first manipulation intention through the PSSCH.

20. A processing device, comprising:
at least one processor; and
at least one memory connected to the at least one processor and storing instructions that, based on being executed, cause a first device to perform operations comprising:
generating at least one token based on a size of a bucket and a token creation rate;
determining, based on a triggering of a first manipulation intention, a number of tokens for executing the first manipulation intention;
transmitting, to a second device, sidelink control information (SCI) for scheduling a physical sidelink shared channel (PSSCH) through a physical sidelink control channel (PSCCH), wherein the SCI includes information regarding a priority, information regarding resource assignment, and information regarding modulation and coding scheme (MCS); and
transmitting, to the second device, a medium access control (MAC) protocol data unit (PDU) including information regarding the number of tokens and a request for the first manipulation intention through the PSSCH.

* * * * *